March 10, 1959  J. O. KNIGHT  2,877,028
COUPLING FOR INTERCONNECTED MULTIPLE TUBE HOSE
Filed Sept. 10, 1954
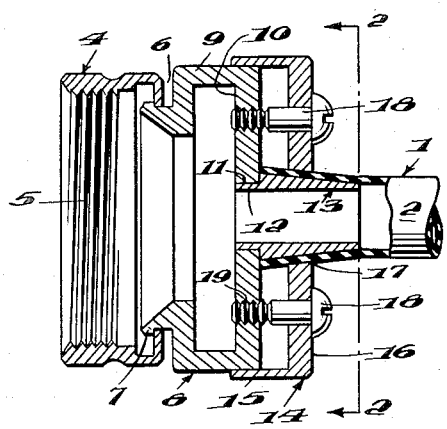
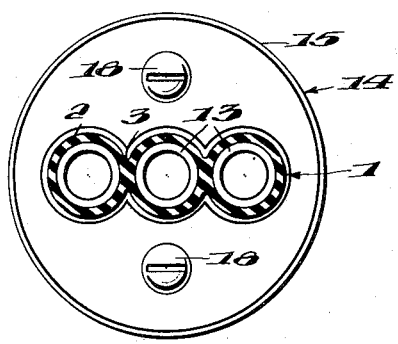
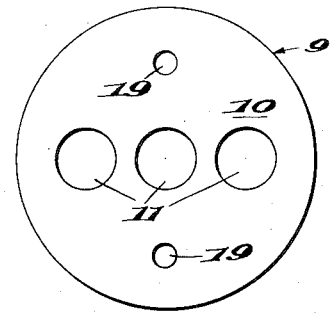
INVENTOR
JAMES O. KNIGHT,
BY Stone, Boyden & Mack,
ATTORNEYS

2,877,028

COUPLING FOR INTERCONNECTED MULTIPLE TUBE HOSE

James O. Knight, Peoria, Ill., assignor to L. R. Nelson Mfg. Co., Inc., Peoria, Ill., a corporation of Illinois Application September 10, 1954, Serial No. 455,223

5 Claims. (Cl. 285—137)

This invention relates to hose couplings and more specifically to multiple tube hose couplings particularly adapted for coupling flexible relatively thin-walled multiple tube perforated hose employed as lawn soakers to a sillcock or to a conventional garden hose.

Multiple tube hoses of this type usually employ two or more tubes in side-by-side relation so that a coupling for such hoses must make a transition from the circular cross-section of a sillcock or the like to the more or less oblong overall cross-section of the multiple tube hose. The present invention provides a novel coupling structure of this type which includes improved means for accomplishing such transition while obtaining a positive fluid-tight clamping of the hose without employing expensive constructions or manufacturing techniques.

In order that the invention may be understood in detail, reference is had to the accompanying drawings which form a part of this specification and wherein:

Fig. 1 is a longitudinal section view illustrating a preferred embodiment of the invention;

Fig. 2 is a view taken on line 2—2, Fig. 1;

Fig. 3 is a detail elevational view of an insert employed in the device of Fig. 1;

Fig. 4 is an end view of the coupling body employed in the device of Fig. 1.

Referring now to the drawings in detail, it will be seen that same involves a 3-tube hose 1 comprising three parallel tubes 2 of circular cross-section arranged side-by-side with adjacent wall portions joined as indicated at 3, Fig. 2. Such hoses are fabricated by extrusion from rubber, synthetic rubber or synthetic resins and are characterized by flexibility of the hose and compressibility of the walls thereof.

The improved coupling for such hose comprises a conventional female coupling nut 4 having threads 5 for engagement with a sillcock or the like. At one end, the coupling nut 4 is provided with an inturned flange 6 engaged behind the external annular flange 7 of a coupling body 8. The body 8 includes a main generally tubular portion 9 of larger diameter than the flange 7 and terminating at the end opposite flange 7 in a transverse stop wall 10. The stop wall 10 is provided with three circular openings 11 spaced along a diameter of the circle of wall 10 in such manner as to be capable of alignment with the tubes 2 of hose 1. Seated in each of the openings 11 is the tubular extension 12 of a rigid, tapered, frustro-conical tubular insert 13. Each insert 13 has a relatively larger base joined to the extension 12, so as to provide shoulder 12a, Fig. 3, for engagement with the exterior surface of stop wall 10. The inserts 13 are constructed for insertion each in a different one of the tubes 2 of hose 1, and taper away from the stop wall 10 so that the small ends of the inserts are disposed inwardly of the tubes 2. The inserts 13 may be free and removable from wall 10 or may be affixed thereto, as by a force fit between extensions 12 and openings 11. Although the element 13 is termed an insert and the part 12 is designated as an extension, the reverse terminology also applies and the inserts 13 may be properly specified as extensions.

Spaced from stop wall 10 is a generally cup-shaped clamping member 14 having an annular flange 15 embracing the outer cylindrical surface of portion 9 of the body 8, as seen in Fig. 1. Clamping member 14 also includes a transversely extending clamping plate 16, constituting the bottom of the cup and disposed generally parallel to stop wall 10. Clamping plate 16 is provided with a diametrically disposed opening comprising three generally circular portions each embracing a different one of the tubes 2 of hose 1. Thus, this opening provides in plate 16 clamping surfaces 17 conforming to the cross-sectional periphery of the hose 1 and embracing the hose in opposition to the inserts 13, as seen in Fig. 1.

The diameters of the generally circular portions of clamping surfaces 17 are so proportioned relative to the shape of the inserts 13 that the annular spaces between the inserts and the clamping surface 17 may be made smaller than the thickness of the walls of the tube 2 by adjusting clamping plate 16 toward stop wall 10, it being understood that during such adjustment the inserts 13 are held stationary by reason of their engagement with the stop wall 10. To provide such adjustment, the invention employs clamping screws 18 extending through clamping plate 16 and threadably engaged with threaded openings 19 in stop wall 10. Thus, the clamping screws 18 serve to draw the clamping plate 16 up toward the stop wall 10, compressing the wall of the hose 1 between the inserts and the clamping plate.

Hoses of the type referred to usually have relatively thins walls. Accordingly, the walls of the clamping surfaces 17 of clamping plate 16 may taper in conformity with the outer surface of the bodies of inserts 13, as seen in Fig. 1. However, when the material of the hose is relatively thicker, the generally circular portion of clamping surfaces 17 may be in the nature of untapered bores having their axes parallel with the axis of the coupling body 8, so as to be embedded in the wall of the hose when the plate 16 is in clamping position.

I claim:

1. In a coupling for removably connecting a flexible relatively thin-walled multiple tube hose to a sillcock or conventional garden hose and wherein said multiple tube hose comprises a plurality of parallel tubes having adjacent walls thereof connected in a common diameter of the tubes; comprising an internally threaded nut for connection with said sillcock or garden hose, a coupling body engaged with said nut for rotation relative thereto and including a tubular portion and a transverse stop wall, and a cup-shaped clamping member having an annular flange slidably embracing the outer cylindrical wall of said tubular portion and a bottom wall providing a clamping plate in spaced parallel relation to said stop wall, said transverse stop wall being provided with a plurality of tubular extensions in open communication with said coupling body and whose axes correspond to the axes of said tubes and said extensions having outer walls converging from said stop wall to the free ends thereof, said extensions being adapted for insertion into the corresponding ends of said tubes which embrace said outer walls of said extensions, and said clamping plate being provided with a single elongated opening having a major axis parallel with a line bisecting the axes of said extensions, and the margin of said elongated opening including arcuate portions conforming to the exterior transverse configurtaion of said multiple tube hose, and means operatively engaged with said stop wall and said clamping plate for drawing the latter toward the former for clamping an end portion of said multiple-tube hose to said extensions.

2. The structure according to claim 1, wherein said stop wall is provided with a plurality of spaced apertures whose axes are in a diameter of the stop wall, and said inserts having tubular extensions at the larger ends thereof with the provision of shoulders spaced inwardly from the free ends of the extensions, said extensions being received in said apertures and said shoulders abutting said stop wall.

3. The structure according to claim 1, wherein said coupling body is provided with an outwardly directed flange and said nut being provided with an inwardly directed flange disposed rearwardly of said first flange for providing said relative rotation, and said means comprises clamping screws extended through apertures in said clamping plate and into tapped apertures in said stop wall.

4. The structure according to claim 1 wherein said margin of said elongated opening is tapered in conformity with said convergence of the outer walls of said extensions.

5. In a coupling for removably connecting a flexible relatively thin-walled multiple tube hose to a sillcock or conventional garden hose and wherein said multiple tube hose comprises a plurality of parallel tubes having adjacent walls thereof connected in a common diameter of the tubes; comprising an internally threaded nut for connection with said sillcock or garden hose, a coupling body engaged with said nut for rotation relative thereto and including a tubular portion and a transverse stop wall, and a clamping member slidably contacting the wall of said tubular portion and a bottom wall providing a clamping plate in spaced relation to said stop wall, said transverse stop wall being provided with a plurality of tubular extensions in open communication with coupling body and whose axes correspond to the axes of said tubes and said extensions having outer walls converging from said stop wall to the free ends thereof, said extensions being adapted for insertion into the corresponding ends of said tubes which embrace said outer walls of said extensions, and said clamping plate being provided with a single elongated opening having a major axis parallel with a line bisecting the axes of said extensions, and the margin of said elongated opening including arcuate portions conforming to the exterior transverse configuration of said multiple tube hose, and means operatively engaged with said stop wall and said clamping plate for drawing the latter toward the former for clamping an end portion of said multiple-tube hose to said extensions.

References Cited in the file of this patent

UNITED STATES PATENTS

| | | |
|---|---|---|
| 626,447 | Strater | June 9, 1899 |
| 1,497,497 | Gapp | June 10, 1924 |
| 1,597,069 | Bork | Mar. 30, 1926 |
| 2,337,510 | Trevaskis | Dec. 21, 1943 |
| 2,438,679 | Parker | Mar. 30, 1948 |
| 2,505,303 | Randa | Apr. 25, 1950 |
| 2,548,078 | Thompson | Apr. 10, 1951 |
| 2,621,075 | Sedar | Dec. 9, 1952 |
| 2,739,842 | Andrews | Mar. 27, 1956 |
| 2,746,799 | Nelson | May 22, 1956 |

FOREIGN PATENTS

| | | |
|---|---|---|
| 909,769 | France | Jan. 7, 1947 |
| 658,084 | Great Britain | Oct. 3, 1951 |
| 1,055,473 | France | Oct. 14, 1953 |
| 786,558 | France | June 8, 1935 |